United States Patent [19]
Förster

[11] Patent Number: 5,413,196
[45] Date of Patent: May 9, 1995

[54] OSCILLATION DAMPER

[75] Inventor: Andreas Förster, Schweinfurt, Germany

[73] Assignee: Fichtel & Sachs AG, Schweinfurt, Germany

[21] Appl. No.: 32,139

[22] Filed: Mar. 17, 1993

[30] Foreign Application Priority Data

Mar. 19, 1992 [DE] Germany .................. 42 08 886.0

[51] Int. Cl.⁶ ............................................. F16F 9/46
[52] U.S. Cl. ................................. 188/299; 188/322.13
[58] Field of Search .............. 188/282, 287, 299, 319, 188/322.13, 322.15, 322.22; 280/707, 714; 137/489, 493, 493.8, 493.9

[56] References Cited

U.S. PATENT DOCUMENTS

| | | | |
|---|---|---|---|
| 4,946,009 | 8/1990 | Knutson | 188/299 |
| 5,035,306 | 7/1991 | Ashiba | 188/299 |
| 5,085,299 | 2/1992 | Spiess et al. | 188/319 |
| 5,180,039 | 1/1993 | Axthammer et al. | 188/299 |
| 5,301,412 | 4/1994 | Hahn et al. | 188/299 |
| 5,303,804 | 4/1994 | Spiess | 188/299 |

FOREIGN PATENT DOCUMENTS

| | | |
|---|---|---|
| 0399326 | 5/1990 | European Pat. Off. . |
| 3917064 | 11/1990 | Germany . |
| 4008326 | 7/1991 | Germany . |
| 4107599 | 10/1992 | Germany . |
| 2227547 | 8/1990 | United Kingdom . |

Primary Examiner—Robert J. Oberleitner
Assistant Examiner—Chris Schwartz

[57] ABSTRACT

According to an illustrative example of the present invention an oscillation damper is provided with a by-pass interconnecting two fluid chambers. A main valve is provided within this bypass for allowing variation of the damping behavior of the oscillation damper. An electro-magnetic valve is used for controlling the hydraulic pressure acting onto the main valve. The electro-magnetic valve is biased toward an emergency position. The biasing force is obtained by two parallel acting springs. A first one of these springs is relatively weak, so that the valve can be transferred by low electric current in a magnetic coil against the action of the weak spring to a first operational position to be used during a major part of the operational time of the oscillation damper. By considerable increase of the electric current the valve can be further transferred into a further operational position which is desired only in exceptional situations. Therefore, a low electric energy consumption is needed for the control of the electro-magnetic valve. The normal operational condition of the electro-magnetic valve is stabilized by the second, harder spring.

26 Claims, 6 Drawing Sheets

OSCILLATION DAMPER

BACKGROUND OF THE INVENTION

Modern oscillation dampers for motor vehicles are provided with electric control means for variation of the damping effect in accordance with the driving conditions. These control means may either be automatic control means which change the damping effect of the oscillation damper in accordance with measured driving parameters such as the amplitude of certain measured oscillation or, alternatively, the driver may control the damping effect according to his desire. For comfortable driving conditions a relatively small damping effect is usually desired, whereas for sportive driving conditions a stronger damping effect is usually requested. If the damping effect becomes too low the security of the vehicle and of the driver is reduced in case of critical driving situations such as rough road surfaces. As the electric control of the oscillation damper may fail it is necessary to make sure that in such case of failure of the electric control the damping effect is adjusted to a predetermined value. As after a failure of the electric control of the oscillation damper there may still occur critical situations such as driving on rough road surface it is necessary to adjust the behavior of the oscillation damper such that the selected adjustment is still in accordance with the safety requirements under such critical driving conditions. It is therefore usual to automatically adjust the damping behavior of an oscillation damper to a relatively strong damping effect in case of failure of the electric control of the oscillation damper. For a long time one has believed that it was necessary to automatically adjust the damping behavior in case of failure of the electric control to the strongest possible damping effect. It has been found, however, (see, for example German patent publication 39 17 064-A1) that it is not always necessary to select the strongest damping effect in case of failure of the electric control. It is rather possible to select an intermediate value of damping effect in case of failure of the electric control. In the present invention both possibilities are considered.

The adjustment of the damping behavior in case of failure of the electric control is as a rule effected by elastic biasing means which displace the components of a control unit which are responsible for adjustment of the damping behavior to a predetermined position when the electric control is interrupted or failure conditions of similar consequences occur. For selecting an adequate damping behavior under normal operational conditions it is necessary to maintain the above mentioned components in an operational position different from the basic position by electro-magnetic transferring means (nominated EM-transferring means in the following description). Such energy is consumed under normal driving conditions for maintaining these components in the respective operational position.

As under normal driving conditions frequently a soft damping effect is desired, for making the vehicle comfortable, the operational damping conditions are during the larger part of the total time of operation of most vehicles softer than the damping conditions to be used in case of failure of the electric control. This means that a considerable amount of energy is dissipated for maintaining the above said components in the operational position corresponding to comfortable driving conditions.

STATEMENT OF THE PRIOR ART

In an oscillation damper design according to the above mentioned German patent publication 39 17 064-A1 a helical compression spring is used for biasing a control unit of the oscillation damper toward a condition corresponding to a failure of the electric control. This spring must be selected relatively strong in order to be compatible with the electro-magnetic force of the electro-magnetic transferring means. Such a relatively high energy consumption occurs when maintaining the control unit under normal driving conditions in a position of small damping effect corresponding to comfortable driving.

Similar problems arise in a further design as disclosed in the European patent publication 0 399 326-A2.

OBJECT OF THE INVENTION

It is an object of the present invention to provide an oscillation damper with variable damping effect which on the one hand is automatically adjusted to a predetermined damping effect in case of failure of the electric control means and on the other hand can be maintained at a usually desired damping effect in normal driving operation (i.e. without failure of the electric control) with a reduced consumption of electric energy.

SUMMARY OF THE INVENTION

An oscillation damper comprises a cylinder unit having an axis and a piston-piston rod unit axially movable with respect to the cylinder unit. Fluid chambers are confined by the cylinder unit and the piston-piston rod unit within cavity means of the cylinder unit. The fluid chambers contain a damping fluid, and more particularly, a damping liquid. Fluid passage means are provided for permitting a throttled fluid flow between at least some of the fluid chambers in response to axial movement of the piston-piston rod unit with respect to the cylinder unit. This throttled fluid flow provides a damping effect resisting to the axial movement of said units. The fluid passage means comprise cross-sectional area variation means within at least one fluid path. These cross-sectional area variation means comprise at least one electro-magnetically operated valve unit (nominated EM-valve unit hereafter). This EM-valve unit comprises biasing means biasing the EM-valve unit toward an emergency condition, frequently also called fail-safe-condition. The EM-valve unit further comprises electro-magnetic transferring means (nominated EM-transferring means hereafter) for transferring the EM-valve unit from the emergency condition to a plurality of operational conditions against the action of the biasing means. The biasing means are selected such that a relatively small electric current supply or voltage supply to the EM-transferring means is sufficient for transferring the EM-valve unit from the emergency condition to a first operational condition and a step-like increased electric current supply to the EM-transferring means is necessary only for transferring the EM-valve unit from the first operational condition to at least one further operational condition.

Preferably, there is provided a plurality of further operational conditions, and still more preferably, there is a continuous variation of further operational conditions beyond the first operational condition. So there is a relatively stable first operational position which is insensitive to small variations of the current supply. With other words: If the current supply exceeds a certain predetermined value the first operational position is obtained and maintained even if this first predetermined value is exceeded by a smaller or larger amount as long as a second predetermined value is not exceeded. This explanation shows that the step-like increase is not necessarily step-like in the sense of a step with sharp edges. It is sufficient to select the biasing means such that the biasing force increases from a value corresponding to the emergency condition slowly to a value providing the transfer to the first operational position and thereafter a stronger increase of the biasing force occurs which requires a step-like increase of the current supply in the sense of a stronger increase of said current supply. One can talk also of a non-linear increase of the biasing force, and correspondingly, of a non-linear increase of the current supply necessary for causing the transition from the first operational condition to a further operational condition. It will be understood that this "step" makes it easy to maintain the EM-valve unit in the first operational condition, even when drifts in the electric control occur. This is highly desirable for making sure that at least one condition of specific comfort is easily adjustable and maintainable.

It is desirable that the first operational condition corresponds to the "usual operational condition", i.e. to that operational condition which is to be selected for a larger portion of the total operational time of a specific vehicle. In this case the energy consumption for the EM-valve unit during the total operational time is at a minimum. The "usual operational condition" is for most comfortable motor vehicles an operational condition corresponding to a low damping effect. Only with special vehicles, such as racing vehicles and vehicles intended for use on rough road surfaces, the "usual operational condition" can correspond to a strong damping effect of oscillation dampers. The further operational conditions will obviously require a considerably increased current supply. As these further operational conditions occur, however, relatively seldom, this increased current supply does not substantially worsen the energy balance.

The cross-sectional area variation means may be provided by a valve member directly movable by the EM-transferring means. Preferably, however, the cross-sectional area variation means comprise a fluid-operated main valve unit. This main valve unit may be subject to a fluid control pressure which is obtained by the EM-valve unit. This principle is known in the art. By using this principle the energy consumption may be further reduced.

As mentioned above, the emergency condition may provide the maximum damping effect. It is, however, also possible and sometimes preferable as already mentioned above, that the damping effect corresponding to the emergency condition is stronger than a minimum damping effect and smaller than a maximum damping effect obtainable by the respective oscillation damper. This might result in further increased safety.

It is always to be considered that the emergency damping effect warrants sufficient safety under all possible driving conditions.

The damping effect may decrease in response to transition from the emergency condition to the first operational condition and may increase again in response to transition from the first operational condition to at least one further operational condition. This is a behavior which is most energy saving in conventional passenger vehicles which are expected to have a weak oscillation damping during a major part of the operational time.

With special vehicles it may be desirable, however, that the damping effect increases in response to transition from the emergency condition to the first operational condition and decreases again in response to transition from the first operational condition to at least one further operational condition. Thus, in accordance with the specific motor vehicle, a low current is always sufficient for maintaining the damping effect at the most usual value.

It is to be noted that according to the present invention the damping effect which corresponds to the emergency condition may occur for a second time when going beyond the first operational position. This appears strange; it is to be considered, however, that the damping effect corresponding to the emergency condition may be required in a specific vehicle only relatively rarely so that it is acceptable to maintain this damping effect by increased current supply, though the same damping effect would be available also as the damping effect corresponding to the emergency condition.

The EM-valve unit may be allocated to an EM-valve path of variable flow resistance. This flow resistance may be variable by the EM-valve unit by continuously or stepwise increasing the current supply to the EM-transferring means.

According to a first embodiment the flow resistance of the EM-valve path may be dependent on the position of one single valve member biased toward an emergency position which emergency position corresponds to the emergency condition. By an EM-valve member, one has to understand a valve member, which is directly movable by an electro-magnetic force. This valve member may be simultaneously an armature of an electromagnet or may be fastened to such an armature. Thus, the EM-valve member is movable by the EM-transferring means, for example, an electric coil from the emergency position toward a first operational position and toward at least one further operational position corresponding to respective operational conditions. In this case, the biasing means may have a discontinuous characteristic in response to movement of the valve member from the emergency position to an operational position most remote from the emergency position. This discontinuous characteristic may have a step-like increase of biasing force in response to the EM-valve member unit being moved beyond the first operational position toward at least one further operational position.

While it may be possible to obtain such a discontinuous characteristic by specially shaped spring means, it is most easy to obtain such a discontinuous characteristic by composing the biasing means of first spring means biasing the valve member unit toward the emergency position and second spring means acting in the same direction as the first spring means but becoming effective only after the valve member unit has been transferred to the first operational position. The first spring means may be softer spring means and the second spring means may be harder spring means. So the valve member unit can be transferred to the first operational position by overcoming only the softer spring means along a relatively short path of movement. This first operational position can then be maintained as the "usual operational position" with small current supply. The second spring means are acting then as some kind of "intermediate abutment". They are overcome only by a considerably stronger electro-magnetic force when it is—in rare cases—necessary to select an operational condition different from the usual operational condition.

The EM-valve member unit may cooperate, for example, with at least two serially connected fluid restriction means of the EM-valve path, i.e. the valve path of the electro-magnetic valve unit. These fluid restriction means have variable cross-sections in response to movement of the EM-valve unit.

In such design a first one of the restriction means may have a minimum cross-sectional area in its emergency position, such that in this emergency position the flow resistance through the EM-valve path is substantially determined by these first restriction means. When the valve member unit is then moved from the emergency position toward the first operational position the cross-sectional area of the first restriction means may be increased. On the other hand, the second restriction means may have a maximum cross-sectional area in the emergency position of the valve member unit such that the flow resistance is not substantially influenced by the second restriction means in the emergency position of the valve member unit. When the valve member unit approaches the first operational position the second restriction means are still opened to such an extent as to provide an usual operational condition with relatively weak damping effect, weaker than the damping effect caused by the first restriction means in the first operational position. When, however, the valve member unit is moved toward a further operational position beyond the first operational position the flow resistance is decreased by the second restriction means adopting a smaller cross-sectional area. This is a behavior very useful for conventional passenger vehicles.

According to another embodiment the flow resistance is defined by at least two fluid restriction means having variable cross-sectional areas determined by two respective EM-valve member units. These EM-valve member units are biased by respective independent biasing means toward respective basic positions corresponding in combination to the emergency condition. The valve member units are movable by—preferably the same—EM-transferring means, away from their respective basic positions to respective further positions independently from each other along at least a respective portion of respective paths of movement. Then respective positions of the valve member units define in combination the first operational condition and at least one further operational condition. For example, the first EM-valve member unit may be movable by the EM-transferring means at a first predetermined current supply level to a first displacement position with the second valve member unit remaining in its basic position. The first restriction means may be completely closed in the basic position thereof. The first valve member unit in the first displacement position and the second valve member unit in the basic position define the first emergency condition with the flow resistance being solely defined by the first restriction means. The first valve member unit and the second valve member unit are hereupon both movable above a predetermined second current supply level by the EM-transferring means to at least one further combination of respective displacement positions corresponding to at least one further operational condition. The two fluid restriction means may be in series or in parallel.

The first valve member unit may have a predetermined play of movement with respect to the second valve member unit and may be movable together with the second valve member unit after consumption of the play of movement. The biasing means allocated to the first valve member unit may be supported at the second valve member unit. In this embodiment the transition from the emergency condition to the first operational condition is effected by a relative movement of the first valve member unit with respect to the second valve member unit by the action of small current with the second valve member unit remaining in its basic position. Hereupon the first and the second valve member units are commonly moved by the EM-transferring means through the action of a considerably increased current level.

The separate movement of the two valve member units is obtained by making the first valve member unit more sensitive to the electro-magnetic field than the second valve member unit. This may be done by either exposing the first valve member unit to a stronger electro-magnetic field or by making the respective biasing means weaker or by providing the first valve member unit with a smaller amount of ferromagnetic material.

The electro-magnetic field may be provided by an annular electro-magnetic coil, preferably in combination with a ferro-magnetic core.

The first and the second valve member units may be axially arranged along a line of movement. One of the valve member units may surround the other one.

For safety maintaining in the emergency position one can use the following concept: An end face of the valve member unit which is exposed to the pressure of the flow path is reduced in cross-sectional area when the valve member unit is in the emergency position. Then the pressure supplied to an opposite end face of the valve member unit exerts in the emergency position a hydraulic force of the biasing means. When the valve member unit is lifted from the emergency position the resulting hydraulic force acting onto the valve member unit should be as small as possible in order to reduce the requirements as to current supply.

It is possible to provide intermediate conditions between the emergency condition and the first operational condition. In practice this is, however, not necessary and not desirable, because it is very difficult to provide intermediate positions only by variation of the current level. It is, however, not excluded that intermediate positions are, for example, provided by a plurality of spring means, become subsequently effective. This possibility exists also for the transition from the first operational condition to an extreme further operational condition.

The biasing means may cooperate with tuning spring means for easily adapting the biasing force to the requirement of the respective control unit.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 1:
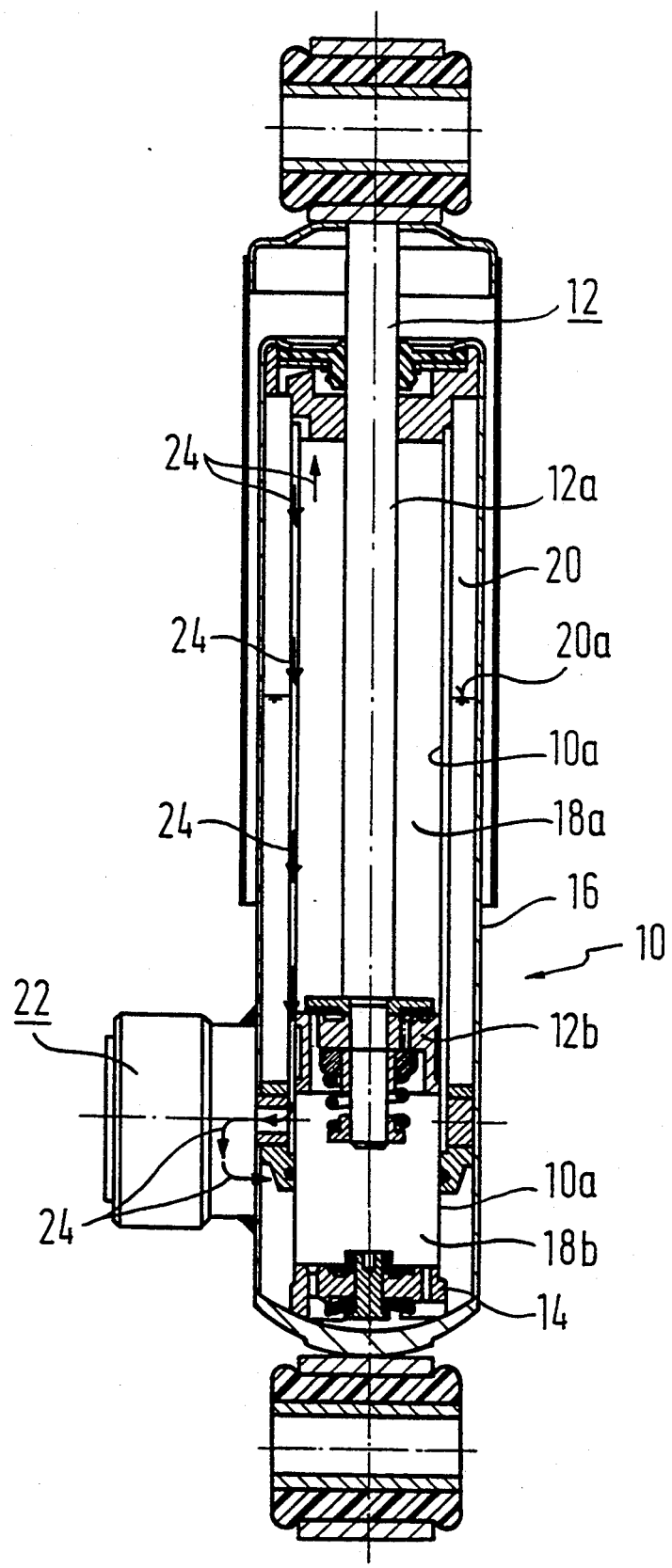
FIG. 1 shows an overall illustration of an oscillation damper of the present invention.

In FIG. 1 a cylinder unit is designated by 10 and a piston-piston rod unit is designated by 12. The piston-piston rod unit 12 comprises a piston rod 12a and a damping piston 12b. The cylinder unit 10 comprises a cylinder member 10a with a bottom valve unit 14 at the lower end thereof and a container tube 16 surrounding the cylinder member. Working chambers 18a and 18b are located within the cylinder member 10a. An annular chamber 20 is defined radially between the cylinder member 10a and the container member 16. The working chambers 18a and 18b are filled with liquid. The annular chamber 20 is filled with liquid up to the level 20a, the rest is filled with gas. On inward movement of the piston rod 12a the flow resistance through the damping piston 12 is relatively small. The flow resistance through the bottom valve unit is larger. The damping action is substantially defined by the bottom valve unit 14. On outward movement of the piston rod 12a the flow resistance for liquid entering into the working chamber 18b is relatively small, so that liquid can easily enter into the working chamber 18b.

A bypass indicated by a sequence of arrows 24 exists between the upper working chamber 18a and the annular chamber 20 which extends through a flow control unit 22. The direction of the arrows 24 corresponds to a flow of liquid from the working chamber 18a toward the annular chamber 20. When the flow control unit 22 is closed the largest damping force or damping effect is obtained for outward movement of the piston rod 12a. When the flow control unit 22 is open the damping effect is reduced in accordance with the increasing cross-sectional area of the flow path 24 through the flow control unit 22.

Figure 2:
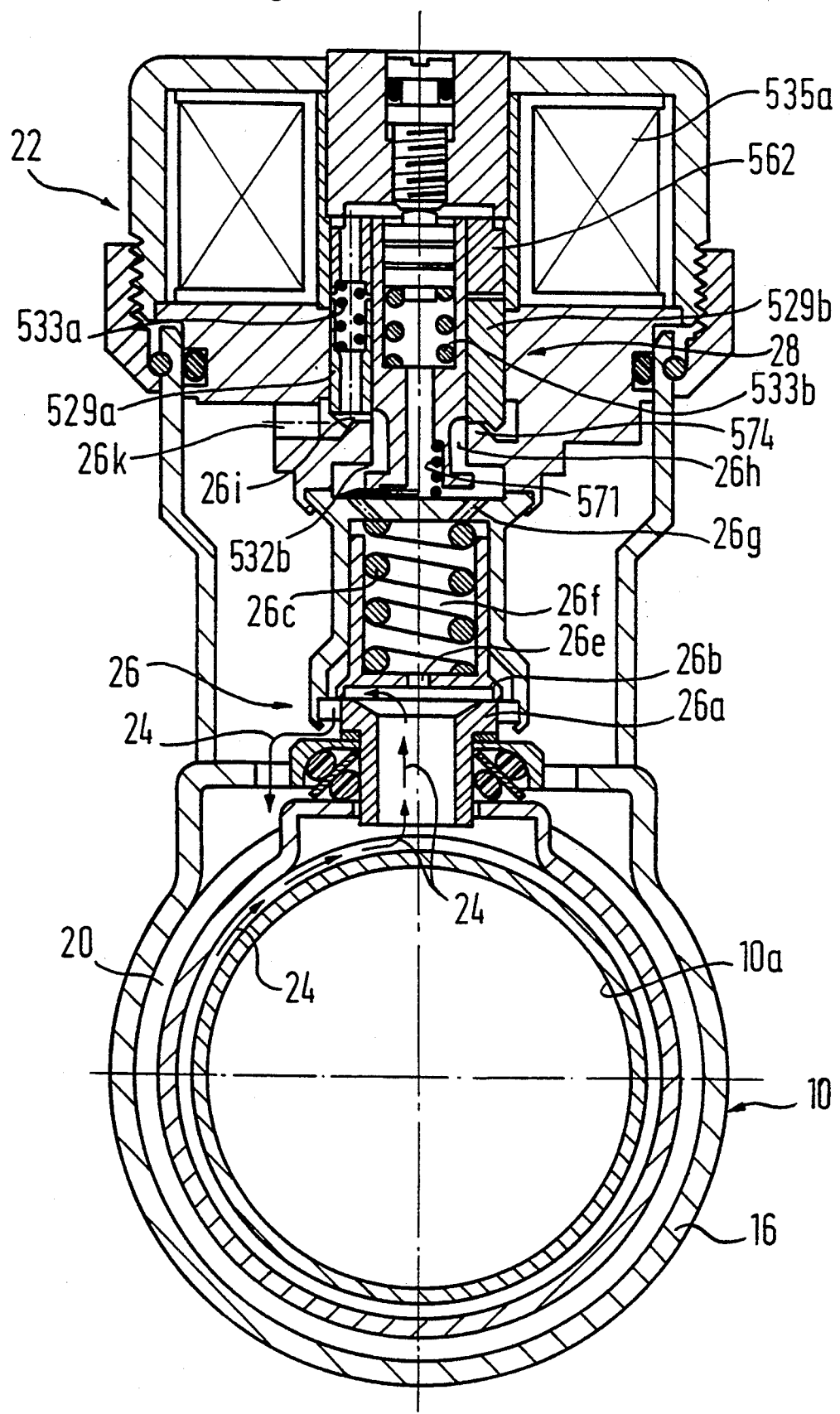
FIG. 2 shows a complete electro-hydraulic control unit for the oscillation damper of FIG. 1.

The flow control unit 22 is shown in more detail in FIG. 2. Analogous parts are designated in FIG. 2 by the same reference numerals as in FIG. 1.

The flow control unit of FIG. 2 comprises a valve seat 26a and a valve member 26b of a main valve unit 26. The cross-sectional area of the more or less open main valve unit 26 defines the flow resistance through the bypass 24. If the valve member 26b is seated on the valve seat 26a as shown in FIG. 2, the bypass 24 is closed and the oscillation damper has the largest damping effect. The valve seat member is urged by a main valve spring 26c toward the valve seat 26a. The main valve member 26b comprises an orifice 26e permitting liquid flow to a liquid chamber 26f. The liquid can further flow from the liquid chamber 26f through openings 26g, a space 26h and a passage 26i, a bore 26k, to the annular chamber 20. The passage 26i is throttled so that a pressure decrease occurs in the liquid flow when passing through the passage 26i. The orifice 26b equally provides a pressure decrease. The pressure within the liquid chamber 26f is depending on the pressure decrease in the orifice 26e and the pressure decrease in the passage 26i. The pressure within the liquid chamber 26f assists the closing action of the spring 26c. The pressure within the liquid chamber 26f may be varied by variation of the cross-sectional area of the passage 26i. Such, one can control the point at which the main valve member 26b is lifted by the pressure of liquid below the main valve member 26b.

The description so far of the control unit is only to be understood as an illustrative example. The subsequent description is referring to an EM-valve unit 28 which is intended to control the pressure within the liquid chamber 26f.

Before describing now details of the EM-valve unit 28 of FIG. 2 another more simple embodiment of the EM-valve unit is described with reference to FIG. 3.

Figure 3:
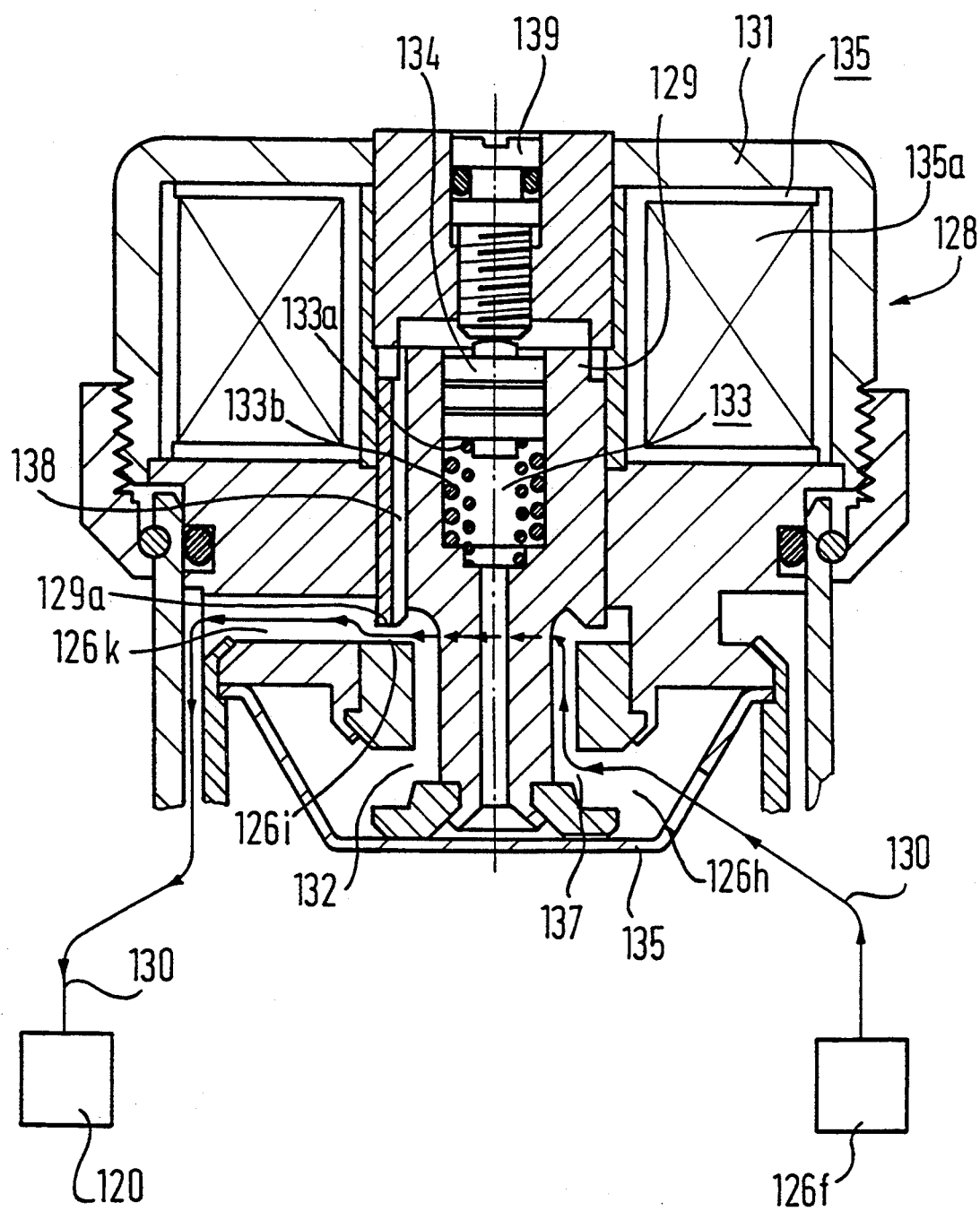
FIGS. 3–6 show modified embodiments of electro-hydraulic servo-control units to be used in an oscillation damper according to FIGS. 1 and 2.

In FIG. 3 the electro-magnetic valve unit is designated by 128 in accordance with the reference number 28 of FIG. 2. For understanding the circuitry to be allocated to FIG. 3, which circuitry is analogous to the circuitry of FIG. 2, a hydraulic flow path 130 has been shown in FIG. 3 which comes from a liquid chamber 126f corresponding to the liquid chamber 26f of FIG. 2 and runs through a chamber 126h corresponding to the chamber 26h of FIG. 2, a restricted passage 126i corresponding to the restricted passage 26i of FIG. 2, a bore 126k corresponding to the bore 26k of FIG. 2 toward an annular chamber 120 corresponding to the annular chamber 20 of FIGS. 1 and 2. The electro-magnetic valve unit is again designated as EM-valve unit 128. This EM-valve unit comprises one single valve member 129 guided within a housing 131. The valve member 129 cooperates with two serially connected restrictions 132 and 126i which has been designated as a restricted passage before.

The valve member is biased by biasing means 133 in downward direction. The biasing means 133 comprise a first helical compression spring 133a and a second helical compression spring 133b. The helical compression spring 133a is supported by a support piston 134 and acts onto the valve member 129 biasing this valve member 129 in downward direction. The helical compression spring 133b is shorter in axial length than the helical compression spring 133a, as one can see in FIG. 3. In FIG. 3 the valve member 129 is urged downward only by the first helical compression spring 133a. The position of FIG. 3 is defined by an abutment cup 135 stationary with respect to the housing 131. This abutment cup 135 simultaneously confines a chamber 126h. The position of the valve member 129, as shown in FIG. 3, represents an emergency position. In this emergency position the restriction 132 has a very large cross-sectional area, as compared with the cross-sectional area of the restriction 126i. So the flow resistance of the flow path 130 between the chamber 126h and the bore 126k is substantially defined by the small restriction 126i. This restriction 126i is defined in its cross-sectional area by an edge 129a of the valve member 129. The cross-sectional area of this restriction 126i in the emergency position, as shown in FIG. 3, is selected such that the main valve member 26b (not shown in FIG. 3 but only in FIG. 2) can open only at a relative high pressure below the main valve member 26b of FIG. 2, so a relatively high damping effect is obtained, which fulfills all safety requirements to the oscillation damper in case the electric control of the valve member 129 (said electric control will be described below) fails and the valve member 129 maintains the position as shown in FIG. 3 in response to the biasing action of the biasing means 133.

The valve member 129 or a portion thereof simultaneously fulfills the function of an armature of an electromagnet designated by 135. This electro-magnet 135 comprises an electro-magnetic coil 135a surrounding the valve member 129.

It is to be noted that the valve member 129 is substantially balanced with respect to hydraulic forces. This is due to the fact that the chamber 126h is connected by a passage 137 with the lower side of the valve member 129 and by a passage 138 with the upper side of the valve member 129. Thus, a relatively small spring 133a is sufficient for maintaining the valve member 129 in the emergency position as shown in FIG. 3 in spite of the pressure of the chamber 126h acting onto the valve member 129. As long as no current is supplied to the electro-magnetic coil 135a, the valve member 129 always remains in the position of FIG. 3 in response to the biasing action of the helical spring 133a. As this position occurs particularly in case of failure of the electric circuitry connected to the electro-magnetic coil 135a the position of FIG. 3 is nominated emergency position. As the cross-sectional area of the restriction 126i is relatively small, a relatively high pressure is maintained in the chamber 126h. As this relatively high pressure in the chamber 126h acts also on the main valve member 26b (as shown in FIG. 2) the emergency position of the valve member 129, as per FIG. 3, results in a relatively strong damping effect as desired in the emergency condition.

In normal operation the electric control circuit for the electro-magnetic coil 135a is expected to be working. In normal operation the driver of a motor vehicle expects a high driving comfort corresponding to a low damping effect of the oscillation damper. When the motor vehicle, for example a passenger vehicle, is taken into operation the electric control unit of the electro-magnetic coil 135a supplies a small current to the electric coil 135a. Thus, the valve member 129 is moved upward by the electro-magnetic field generated by means of the electro-magnetic coil 135a. The electric current supply to the electro-magnetic coil 135a provided by the electric control unit is, when starting the motor vehicle and when driving on normal smooth roads, relatively small. It is, however, sufficient to provide an electro-magnetic force onto the valve member 129 of such magnitude as to overcome the biasing force of the first biasing spring 133a. Thus, the valve member 129 is lifted until the second biasing spring 133b becomes engaged between the valve member 129 and the spring support piston 134. The electric current supply delivered to the electro-magnetic coil 135a in normal driving condition is not sufficient to overcome the helical compression spring 133b. So the valve member 129 comes to a standstill at or shortly after the biasing spring 133b has been engaged with both the valve member 129 and the valve support piston 134. The second biasing spring 133b therefore acts as an abutment which prevents further upward movement of the valve member 129 as long as in response to normal operation only a small electro-magnetic current is supplied to the coil 135a. The position of the valve member 129 when abutting the second biasing spring 133b is nominated as a first operational position and corresponds to the normal comfortable operation of the oscillation damper in which a main valve member 26b of FIG. 2 can be easily lifted by the liquid pressure below the main valve member 26b. This is due to the fact that the liquid pressure within the chamber 126h is small and this again is due to the fact that the cross-sectional area of the restriction 126i has been increased by the upward movement of the valve member 129. Simultaneously, with the increase in the cross-sectional area of the restriction 126i by the upward movement of the valve member 129 also the restriction 132 has been reduced in cross-sectional area. It is assumed, however, that in the first operational position as defined above, both restrictions 132 and 126i are so large in cross-sectional area that the desired low pressure is obtained in the chamber 126h which facilitates an easy lifting of the main valve member 26b.

This condition exists, for example, when driving on a highway. Low energy is necessary for maintaining the valve member 129 in the first operational position.

Only when a sensor detects that for safety reasons a stronger damping effect is required from the oscillation damper, the sensor causes a strongly increased current supply to the coil 135a such as to overcome the force of the stronger biasing spring 133b. Only then the valve member 129 is further lifted with compression of both the biasing spring 133a and the biasing spring 133b. Thus, the restriction 126i is further increased in cross-sectional area, the cross-sectional area of the restriction 132 is, however, reduced now. Accordingly, the pressure within the chamber 126h is again increased and the damping behavior of the oscillation damper becomes harder because the valve member 26b of FIG. 2 can only be lifted in response to strongly increased pressure below the main valve member 26b.

Preferably, the electric control of the electro-magnetic coil 135a allows a continuous variation of the valve member 129 so that the cross-sectional area 132 can be continuously reduced by further increasing the current supply. Thus, the cross-sectional area of the restriction 132 may be widely reduced or even completely closed so that the bypass-path 24 of FIGS. 1 and 2 is completely closed and the oscillation damper adopts its maximum damping effect.

One can recognize in FIG. 3 an adjustment screw 139 which acts onto the spring support piston 134. By adjusting this adjustment screw 139 the position of the spring support piston 134 can be adjusted so as to adjust also the pretension of the small biasing spring 133a and to adjust the play of the biasing spring 133b which is to be consumed before this biasing spring 133b becomes effective.

Figure 4:
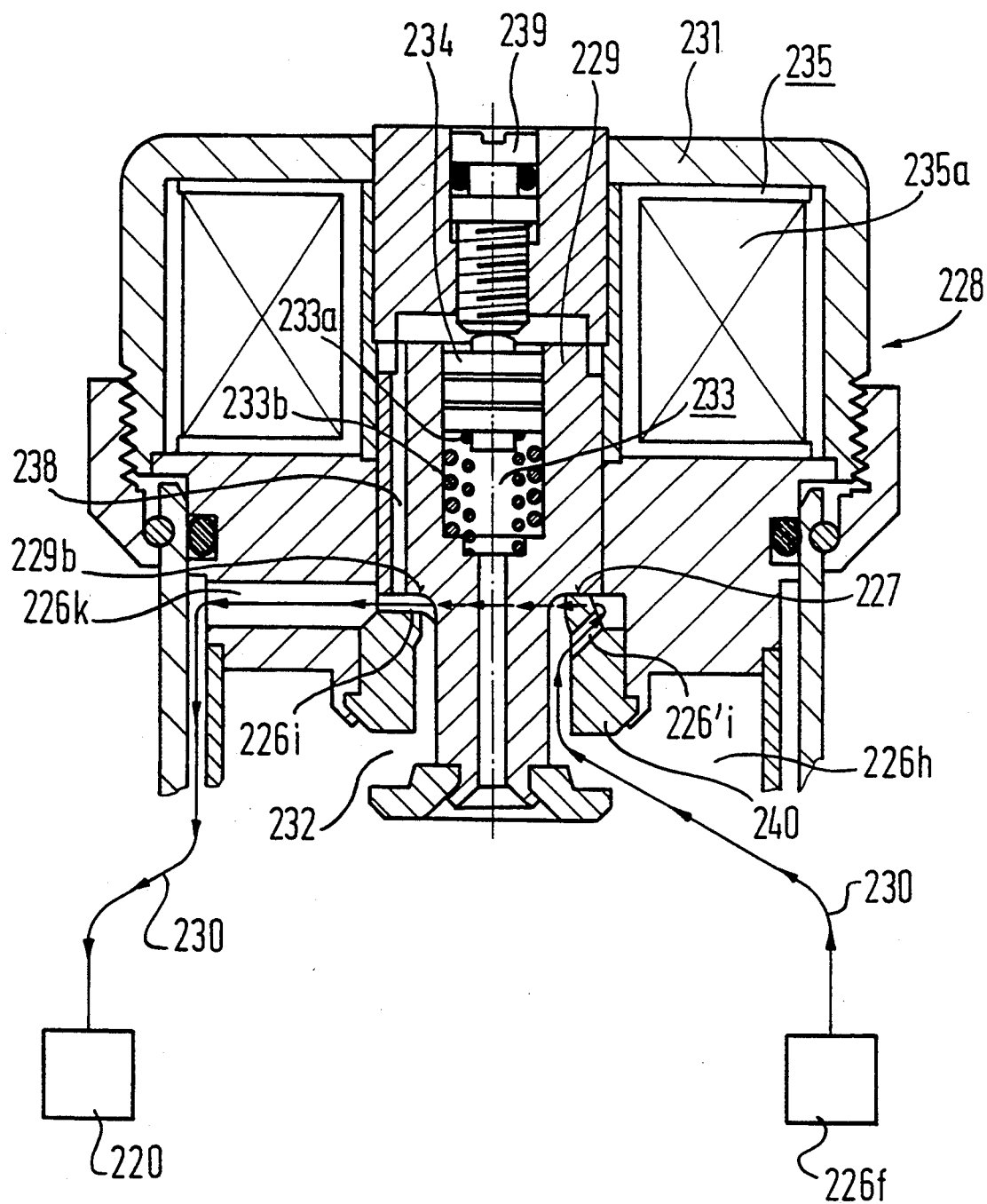

The design of FIG. 4 is very similar to the design of FIG. 3 both with respect to the mechanical parts and with respect to the flow path 230. Similar elements are designated with the same reference numerals as in FIG. 3, increased by 100.

A first difference refers to the abutment positioning the valve member 229 in the lowest possible position. This abutment is provided by the upper end face 227 of a ring member 240 against which a shoulder face 229b of the valve member 229 abuts in the lowermost position, i.e. in the emergency position of the valve member 229. A further difference over the embodiment of FIG. 3 is as follows: The flow path 230 runs here through a bore 226'i of the ring member 240. This bore has an invariable cross-sectional area which defines flow resistance along the flow path 230 in the emergency position as shown in FIG. 4. It is to be noted that in this embodiment the passage 226i located at the same place as the restriction 126i in the embodiment of FIG. 3 is lacking.

So the bore 226'i fulfills the function of determining the flow resistance in the emergency position of the valve member 229 as shown in FIG. 4. When the current supply through the electro-magnetic coil 235a is switched on, for example, starting the engine, a low current is supplied to the electro-magnetic coil 235a so that the biasing action of the weak biasing spring 233a is overcome until the harder biasing spring 233b engages both the spring support piston 234 and the valve member 229. Then the first operational position of the valve member 229 is reached again corresponding to a first operational condition of the device in which the behavior of an oscillation damper is soft and comfortable. This is due to the fact that a gap is opened in parallel with the bore 226'i at the interface between the shoulder valve member 229 and the face 227. Accordingly, the flow resistance through the flow path 230 is reduced, the pressure within the liquid chamber 226f is reduced and the main valve member 26b of FIG. 2 can be more easily lifted by the pressure below it.

On the left hand side of FIG. 4 there has also been shown an open gap below the arrow allocated to 229b. This represents an alternative: One can avoid the bore 226'i when at 230b there is again a restricted flow passage 226' corresponding to the restricted flow passage at 126i,129a of FIG. 3 in the emergency position.

In the embodiment of FIG. 4, as well as in the embodiment of FIG. 3, the valve member 229 automatically returns into the emergency position as shown when the current supply to the electro-magnetic coil 235a breaks down.

For the rest, the construction and the operation of the EM-valve unit 228 of FIG. 4 corresponds to the construction and behavior of the embodiment according to FIG. 3.

Figure 5:
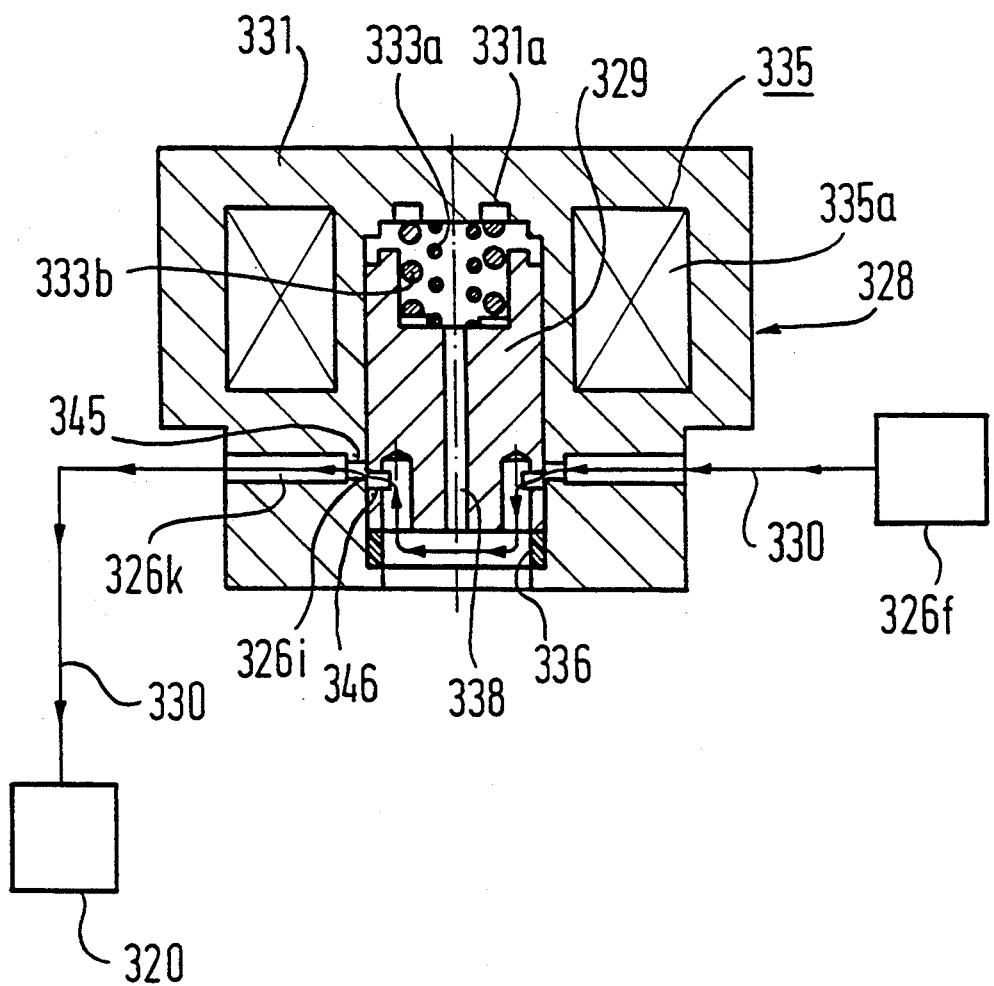

In the embodiment of FIG. 5 similar components are again designated with the same reference numerals, increased by further 100.

In this embodiment a slide valve member 329 is used instead of the seat valve member of the preceeding Figures. The flow resistance of the flow path 330 is determined by the relative position of the slide valve member 329 with respect to the housing 331. More particularly, the flow resistance is defined by the degree of axial overlapping of the bore or annular groove 345 of the housing 331 on the one hand and the bore or groove 346 of the slide valve member 329 on the other hand. In FIG. 5 there is again shown the emergency position of the slide valve member 329. There is only small overlapping of the bores 345 and 346 so the flow resistance is relatively large, the pressure in the liquid chamber 326f is relatively high and the behavior of the oscillation damper as shown in FIGS. 1 and 2 is relatively hard. When the engine is started, a low current is supplied to the electro-magnetic coil 325a such that the soft spring 333a is compressed and the slide valve member 329 is moved until the harder spring 333b engages both the slide valve member 329 and the housing 331 within the annular groove 331a. Such, a stabilized intermediate position of the slide valve member 329 is obtained again which corresponds to the first operational position and which further corresponds to a first operational condition of the oscillation damper adapted to normal driving on smooth road surfaces. This condition can be maintained again by the small current through the coil 335a with little energy consumption. In this first operational position of the slide valve member 329 the bores 345 and 346 are substantially aligned with each other in radial direction and have a maximum degree of overlapping. So the flow resistance in the flow path 330 is at a minimum corresponding to low pressure within the liquid chamber 326f and corresponding to a soft behavior of the oscillation damper for the reasons explained before. When now a sensor recognizes a need for harder damping by the oscillation damper a step-like increased current is supplied to the electro-magnetic coil and the slide valve member 329 is further lifted beyond the first operational position by compressing the harder spring 333b and further compressing the softer spring 333a. Thus, the degree of overlapping between the bores 345 and 346 is reduced again and the flow resistance through the flow path 330 becomes larger, one can again talk of "further operational positions" which may be continuously selectable by continuous increase of the current supply beyond the step-like increased current supply. When the current supply breaks down for any reason the slide valve member 329 returns into the position as shown in FIG. 5, i.e. into the emergency position. The slide valve member is balanced with respect to hydraulic forces by the bore 338 connecting the flow path 330 with the upper side of the slide valve member 329.

An interesting effect is obtained by this design: Due to the sealing ring 336 the lower pressure engagement face of the slide valve member 329 is reduced in the emergency position as shown in FIG. 5, such that the downward acting hydraulic force resulting from the pressure above the slide valve member 329 exceeds the upward directed hydraulic force acting onto the lower end face of the slide valve member 329. Thus, the slide valve member is stabilized in the emergency position as shown in FIG. 5. A very small lifting of the slide valve member 329 is sufficient for making the total lower end face of the slide valve member 329 exposed to the pressure at the lower end of the slide valve member. Accordingly, the force to be exerted by the electro-magnetic field onto the slide valve member for transferring the slide valve member toward the first operational position (full overlapping of 345 and 346) is further reduced and also the increased supply of electric current necessary for moving the slide valve member further upward into further operational positions is reduced.

Figure 6:
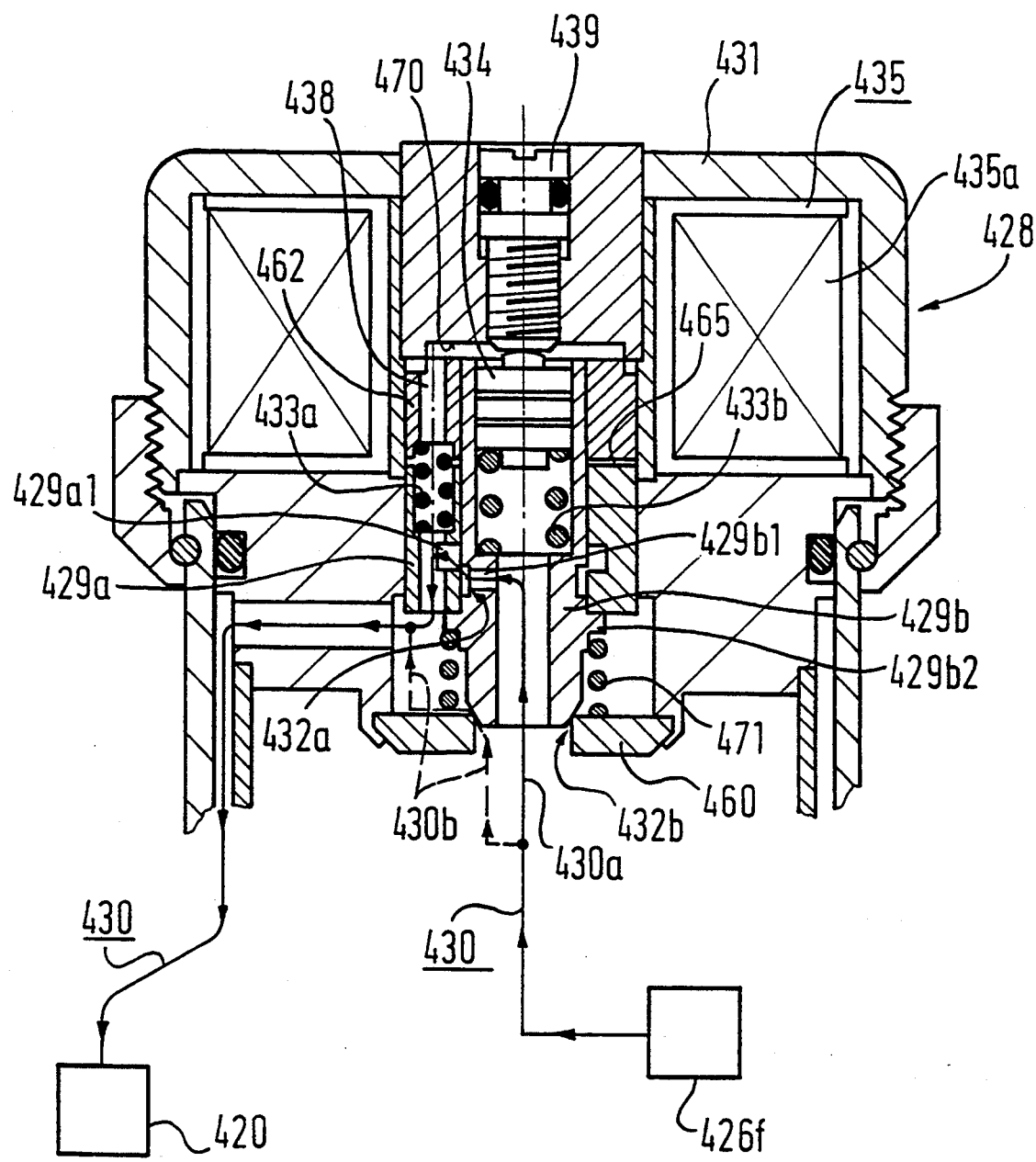

In the embodiment of FIG. 6 analogous components are again designated by the same reference numerals as in the preceeding embodiments, increased by further 100.

In this embodiment the flow path 430 comprises two parallel branch paths 430a and 430b. A first restriction 432a is allocated to the first branch path 430a and a second restriction 432b is allocated to the second branch path 430b. The first restriction 432a is defined by a first valve member 429a whereas the second restriction 432b is defined by a second valve member 429b. More particularly, the first restriction 432a is defined by the first valve member 429a and the second valve member 429b in mutual cooperation. The first valve member 429a has a radial bore 429a1 and the second valve member 429b has a bore 429b1. The degree of axial overlapping of the bores 429a1 and 429b1 defines the cross-sectional area of the first restriction 432a, the second restriction 432b is in particular defined by mutual cooperation of the second valve member 429b and a valve seat 460. In FIG. 6 there is again shown the emergency condition. In as much as the restriction 432b is completely closed the flow resistance of the flow path 430 is exclusively defined by the flow resistance in the branch path 430a and the flow resistance through the branch path 430a is dependent on the axial overlapping degree between the bores 429b1 and 429a1. This overlapping is at a minimum as shown in FIG. 6, so the flow resistance in the flow path 430 is high, the pressure in the liquid chamber 426f is also high, the main valve member 26 can only be lifted by a high pressure below it, and the damping behavior of the oscillation damper is therefore a hard one. The valve member 429b is urged in the emergency position according to FIG. 6 by the biasing spring 433b which is again supported by the spring support piston 434. The first valve member 429a is maintained in the emergency position as shown in FIG. 6 by the first biasing spring 433a which is softer than the second biasing spring 433b. The first biasing spring 433a is supported by an armature member 462 which is fastened to the second valve member 429b. A pressure compensation duct 438 extends through both the armature 462 and the first valve member 429a. The first valve member 429a is surrounding the second valve member 429b. In the emergency position as shown in FIG. 6 the first valve member 429a rests on the shoulder 429b2 of the second valve member 429b.

When the motor vehicle is started the electro-magnetic coil 435a receives a small current supply. Thus, an electromagnetic field is built up to which both the armature 462 of the second valve member 429b and the iron-material of the first valve member 429a are exposed. The electro-magnetic field is so weak that only the first valve member 429a is lifted, whereas the second valve member 429b remains in its position as shown in FIG. 6. The lifting of the first valve member 429a is stopped, when the upper end of the first valve member 429a abuts against the armature 462, i.e. when the gap 465 is closed. One can see from FIG. 6 that in this position of the first valve member 429a the restriction 432a is completely closed because the bores 429a1 and 429b1 are free of overlapping. This means that the flow path 430 is completely closed. Thus the liquid pressure in the liquid chamber 426f is at a maximum and this results in a very hard damping action of the oscillation damper, because the main valve member 26b of FIG. 2 can be lifted only in response to very high pressure below it. This is again the first operational condition in the terminology of the present invention. This first operational condition corresponds, however, to a very hard damping effect. Therefore this embodiment of FIG. 6 is particularly applicable to sportive vehicles in which a hard damping effect is desirable under normal driving conditions. One can recognize that this first operational condition corresponding to a hard damping effect is obtainable by low current supply to the electro-magnetic coil 435a such that again the normal operational condition can be obtained with a minimum of power consumption. Even a sportive driver may desire a more comfortable operation. When increasing—for example by manual operation—the current supply to the electro-magnetic coil to a considerable degree the electro-magnetic field becomes so strong that also the second valve member 429b is lifted. During such lifting the first valve member 429a remains in its elevated position with respect to the second valve member 429b. The restriction 432a remains consequently fully closed but the restriction 432b is opened such that the resulting flow resistance through the flow path 430 is again reduced with the result that the pressure in the liquid chamber 426f is also reduced and the damping behavior of the oscillation damper becomes softer. This is a further operational condition in the terminology of the present invention. When the current supply to the coil 435a breaks down for what ever reason the device of FIG. 6 returns into the condition as shown in FIG. 6, i.e. into the emergency condition. It is easily understandable that the operational condition of minimum damping effect is obtained when the armature 462 abuts the abutment face 470 such that the gap between this abutment face 470 and the armature 462 is closed. The embodiment of FIG. 6 has the advantage that the springs 433a and 433b are both allocated to only one respective valve member 429a and 429b respectively. Therefore the tuning of the device of FIG. 6 is very simple.

A further improvement in tuning is obtainable by a tuning spring 471 which may be replaceable by other tuning springs. The adjustment screw 439 cooperates only with the second biasing spring 433b. This is a further improvement as to the tuning operation of the device.

Returning now to FIG. 2, the EM-valve unit 28 has not yet been described. One recognizes by a comparison of the drawings that the two valve members 529a and 529b and the respective biasing springs 533a and 533b are arranged as shown in FIG. 6. The restrictions 532b and 26i are, however, arranged in series as in FIG. 3. The position of FIG. 2 corresponds to the emergency condition: The flow path extending from 26f through 26g, 532b, 26g, 26i, 26k to 20, has a flow resistance defined by the cross-sectional area of the restriction 26i. This corresponds to the emergency condition because the flow resistance through 26i is high, the pressure in the liquid chamber 26f is therefore also high, and the main valve member 26b can only be opened by high pressure below the valve member 26b. The cross-sectional area of the passage 26i is defined in mutual cooperation of the valve member 529a and a valve seat 574. When starting the vehicle a small current supply flows to the coil 535a such that the valve member 529a is lifted from the valve seat member 574. Such, the cross-sectional area of the restriction 26i is increased. This is a first operational condition corresponding to weak oscillation dampers.

When a sensor recognizes that a further operational condition should be used having harder damping effect on the oscillation damper a step-like increased current supply must be given to the electro-magnetic coil 535a such that the electro-magnetic field can force the second valve member 529b against the action of the harder biasing spring 533b upward. Therefore, the second restriction 532b is reduced in cross-sectional area and the flow resistance is increased again with the result that the damping behavior of the oscillation damper becomes harder again. When the current supply to the coil 535a breaks down the device returns into the condition as shown in FIG. 2, i.e. into the emergency condition having a relatively hard damping effect.

One can see from FIG. 2 again tuning springs 571 comparable in their function with the tuning spring 471 of FIG. 6. According to the left side of FIG. 2 the helical compression spring 571 may be replaced by cup springs.

It is possible to use the EM-valve units as shown in FIGS. 2 to 6 also for direct electric control of the main valve member 26b as shown in FIG. 2.

It will be further understood that by replacing the biasing springs, one can easily adapt the oscillation damper in its behavior to a required behavior.

A specific advantage of the present invention is that by one electro-magnetic coil two valve members can be moved.

In the embodiment of FIG. 6 the second valve member 429b is preferably made of a non-magnetic material.

It is desirable that with reference, for example, to FIG. 3, the biasing force of the biasing spring 134 increases only slowly when moving the valve member 129 from the emergency position, as shown, to a first operational position such that the current supply can be kept still smaller and substantially constant during this operational phase. A slow increase of the biasing force may be obtained by using a helical spring 133a with a substantially linear characteristic. Such a compressional spring of linear characteristic can be obtained by prestressing a long helical compression spring to a length as shown in FIG. 3. The basic elasticity coefficient of the helical compression spring and the length reduction when inserted between the support piston 134 and the valve member unit 129 will be such that a desired value of biasing force is obtained. The prestressed spring will not substantially change its biasing force when it is further compressed by movement of the valve member unit 129 from the emergency position to the first operational position.

While specific embodiments of the invention have been shown and described in detail to illustrate the application of the inventive principles, it will be understood that the invention may be embodied otherwise without departing from such principles.

What I claim is:

1. An oscillation damper comprising a cylinder unit having an axis and a piston-piston rod unit axially movable with respect to said cylinder unit, fluid chambers being confined by said cylinder unit and said piston-piston rod unit within cavity means of said cylinder unit, said fluid chambers containing a damping fluid, fluid passage means for permitting a throttled fluid flow between at least some of said fluid chambers in response to axial movement of said piston-piston rod unit with respect to said cylinder unit, said throttled fluid flow providing a damping effect resisting said axial movement, said fluid passage means comprising cross-sectional area variation means within at least one fluid path, said cross-sectional area variation means being controlled by at least one EM-valve unit (electromagnetically operated valve unit), said EM-valve unit having biasing means for biasing said EM-valve unit toward an emergency condition and EM-transferring means (electromagnetic transferring means) for transferring said EM-valve unit from said emergency condition to a plurality of operational conditions against the action of said biasing means, said biasing means exerting a weaker resistance to a change of said E-M valve unit from said emergency condition to a first operational condition and a stronger resistance to a change of said E-M valve unit from said first operational condition to least one further operational condition and the rate of change of the increase in said resistance during the change from said emergency condition to said first operational condition being less that the rate of change of the increase of said resistance during the change from said first operational condition to said at least one further operational condition.

2. An oscillation damper as set forth in claim 1, said EM-valve unit being allocated to an EM-valve path of variable flow resistance.

3. An oscillation damper as set forth in claim 2, said flow resistance of said EM-valve path being dependent on the position of one single valve member unit biased by said biasing means an emergency position corresponding to said emergency condition and being movable by said EM-transferring means from said emergency position toward a first operational position and said at least one further operational position corresponding to respective operational conditions, said biasing means having a non-linear characteristic in response to movement of said valve member unit with the rate of increase of the biasing force in response to said valve member unit being moved beyond said first operational position toward said at least one further operational position being greater than the rate of increase of the biasing force in response to said valve member unit being moved from said emergency position toward said first operational position.

4. An oscillation damper as set forth in claim 3, said EM-valve member unit cooperating with at least two serially connected fluid restriction means of said EM-valve path having variable cross-sections in response to movement of said EM-valve member unit.

5. An oscillation damper as set forth in claim 4, a first one of said restriction means having its minimum cross-sectional area in the emergency position of said valve member unit such as to substantially determine the flow resistance through said EM-valve path and being increased in cross-sectional area in response to movement of said valve member unit from said emergency position toward said first operational position and said second restriction means having a maximum cross-sectional area in said emergency position of said valve member unit and being reduced in cross-sectional area in response to movement of said valve member unit away from said emergency position.

6. An oscillation damper as set forth in claim 3, said biasing means comprising first spring means biasing said valve member unit toward said emergency position and second spring means acting in the same direction as said first spring means but being effective only after said valve member unit has been transferred toward said first operational position.

7. An oscillation damper as set forth in claim 2, said flow resistance being defined by at least two fluid restriction means, each of said fluid restriction means comprising a respective EM-valve member unit, said EM-valve member unit being biased by respective biasing means toward respective basic positions corresponding in combination to said emergency condition, said valve member unit being movable by said EM-transferring means away from their respective basic positions to respective further positions independently from each other along at least a respective portion of respective paths of movement, said respective further positions of said valve-member units defining in combination said first operational condition and said at least one further operational condition.

8. An oscillation damper as set forth in claim 7, said at least two fluid restriction means being arranged in parallel within said flow path.

9. An oscillation damper as set forth in claim 7, said restriction means being connected in series along said flow path.

10. An oscillation damper as set forth in claim 7, said first EM-valve member unit being movable by said EM-transferring means at a first predetermined current supply level to a first displacement position with said second valve member unit remaining in its basic position, said first valve member unit in said first displacement position and said second valve member unit in said respective basic position defining said first operational condition, said first valve member unit and said second valve member unit being both movable above a predetermined second current supply level by said EM-transferring means to at least one further combination of respective displacement positions corresponding to said at least one further operational condition.

11. An oscillation damper as set forth in claim 7, said first valve member unit having a predetermined play of movement with respect to said second valve member unit and being movable together with said second valve member unit after consumption of said play of movement, said biasing means allocated to said first valve member unit being supported at said second valve member unit.

12. An oscillation damper as set forth in claim 7, said first and said second valve member unit being coaxially arranged along a line of movement, one of said valve member units surrounding the other one of said valve member units.

13. An oscillation damper as set forth in claim 12, the other one of said valve member units being made of a non-magnetic material and being combined with an armature for common movement.

14. An oscillation damper as set forth in claim 1, said cross-sectional area variation means including a fluid operated main valve unit, said fluid operated main valve unit being subject to a fluid control pressure said fluid control pressure being controlled by said EM-valve unit.

15. An oscillation damper as set forth in claim 1, said emergency condition providing an emergency damping effect which is stronger than a minimum damping effect and smaller than a maximum damping effect.

16. An oscillation damper as set forth in claim 1, said emergency condition providing a maximum damping effect.

17. An oscillation damper as set forth in claim 1, said damping effect decreasing in response to transition from said emergency condition to said first operational condition and increasing again in response to transition from said first operational condition to said at least one further operational condition.

18. An oscillation damper as set forth in claim 1, said damping effect increasing in response to transition from said emergency condition to said first operational condition and decreasing again in response to transition from said first operational condition to said at least one further operational condition.

19. An oscillation damper as set forth in claim 1, at least one valve member unit of said EM-valve unit having oppositely directed fluid pressure charged faces for substantially balancing fluid forces onto said valve member unit at least in a first operational position.

20. An oscillation damper as set forth in claim 1, at least one valve member unit of said EM-valve unit having in an emergency position corresponding to said emergency condition a reduced pressure loaded cross-sectional area for pressure acting against said biasing means such that the biasing force of said biasing means urging said valve member unit toward said emergency position is assisted by hydraulic pressure acting on an opposite face of said valve member unit.

21. An oscillation damper as set forth in claim 1, tuning spring means being provided, having a spring action opposite to the biasing action of said biasing means.

22. An oscillation damper as set forth in claim 1, said biasing means providing a biasing force on at least one EM-valve unit opposed to movement of said EM-valve member unit away from an emergency position corresponding to said emergency condition, said biasing force being substantially invariable during movement of said EM-valve member unit from the emergency position to a first operational position corresponding to said first operational condition.

23. An oscillation damper as set forth in claim 22, said biasing means being under pretension in a most extended condition corresponding to said emergency position.

24. An oscillation damper comprising a cylinder unit having an axis and a piston-piston rod unit axially movable with respect to said cylinder unit, fluid chambers being confined by said cylinder unit and said piston-piston rod unit within cavity means of said cylinder unit, said fluid chambers containing a damping fluid, fluid passage means for permitting a throttled fluid flow between at least some of said fluid chambers in response to axial movement of said piston-piston rod unit with respect to said cylinder unit, said throttled fluid flow providing a damping effect resisting said axial movement, said fluid passage means comprising cross-sectional area variation means within at least one fluid path, said cross-sectional area variation means being controlled by at least one EM-valve unit (electromagnetically operated valve unit), said EM-valve unit having biasing means for biasing said EM-valve unit toward an emergency condition and EM-transferring means (electromagnetic transferring means) for transferring said EM-valve unit from said emergency condition to a plurality of operational conditions against the action of said biasing means, said biasing means having a non-linear characteristic and exerting a weaker resistance to a change of said E-M valve unit from said emergency condition to a first operational condition and a stronger resistance to a change of said E-M valve unit from said first operational condition to at least one further operational condition and the rate of change of the increase in said resistance during the change from said emergency condition to said first operational condition being less than the rate of change of the increase of said resistance during the change from said first operational condition to said at least one further operational condition.

25. An oscillation damper as set forth in either claim 1 or claim 24, said biasing means including at least two spring units for obtaining different rates of change in said resistances by selectively using only one of said at least two spring units or a combination of said at least two spring units.

26. An oscillation damper comprising a cylinder unit having an axis and a piston-piston rod unit axially movable with respect to said cylinder unit, fluid chambers being confined by said cylinder unit and said piston-piston rod unit within cavity means of said cylinder unit, said fluid chambers containing a damping fluid, fluid passage means for permitting a throttled fluid flow between at least some of said fluid chambers in response to axial movement of said piston-piston rod unit with respect to said cylinder unit, said throttled fluid flow providing a damping effect resisting said axial movement, said fluid passage means comprising cross-sectional area variation means within at least one fluid path, said cross-sectional area variation means being controlled by at least one EM-valve unit (electromagnetically operated valve unit), allocated to an EM-valve path of variable flow resistance, said flow resistance of said EM-valve path being dependent on the position of one single valve member unit, said valve member unit being biased by biasing means toward an emergency position and being movable by EM-transferring means (electro-magnetic transferring means) from said emergency position to a first operational position and beyond said first operational position to at least one further operational position, said biasing means comprising first spring means biasing said valve member unit toward said emergency position and second spring means acting in the same direction as said first spring means but being effective only after said valve member unit has been transferred toward said first operational position, such that said biasing means has a non-linear characteristic in response to a movement of said valve member unit with the rate of increase of the biasing force during a transition from said first operational position to said at least one further operational position being greater than the rate of increase of the biasing force during a transition from said emergency position to said first operational position.

* * * * *

UNITED STATES PATENT AND TRADEMARK OFFICE
CERTIFICATE OF CORRECTION

PATENT NO. : 5,413,196
DATED : May 9, 1995
INVENTOR(S) : Andreas Förster

It is certified that error appears in the above-indentified patent and that said Letters Patent is hereby corrected as shown below:

Col. 15, line 58, "to least" should read --to at least--;
Col. 15, line 62, "that" should read --than--;
Col. 16, line 4, "an" should read --to an--;
Col. 17, line 31, "pressure said" should read --pressure, said--.

Signed and Sealed this

Tenth Day of October, 1995

Attest:

BRUCE LEHMAN

*Attesting Officer*     *Commissioner of Patents and Trademarks*